Figure 1:
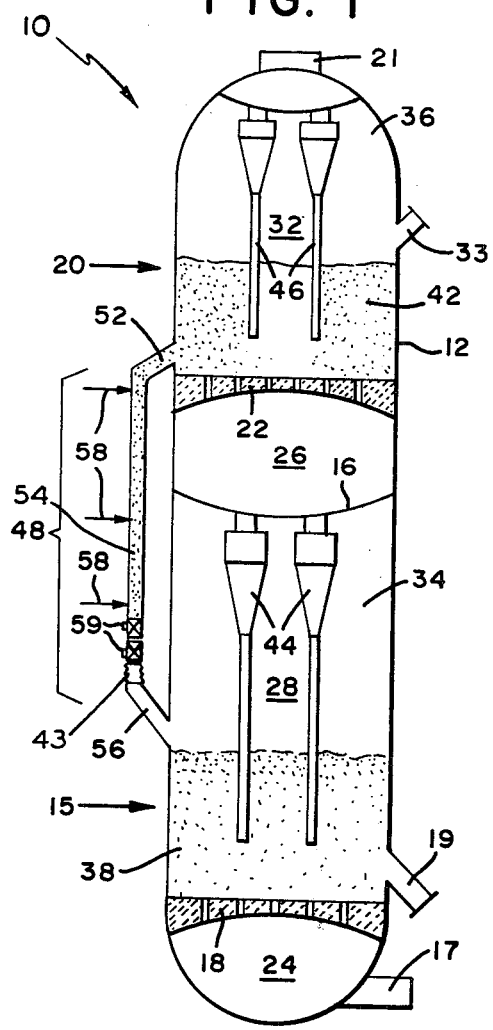

United States Patent [19]

Jukkola et al.

[11] 4,115,070

[45] Sep. 19, 1978

[54] TRANSFER PIPE SYSTEM

[75] Inventors: Walfred Wilhelm Jukkola, Westport, Conn.; Giorgio Tomasicchio, Milan, Italy

[73] Assignee: Dorr-Oliver Incorporated, Stamford, Conn.

[21] Appl. No.: 802,414

[22] Filed: Jun. 1, 1977

[51] Int. Cl.² .............................................. B01J 8/28
[52] U.S. Cl. .................................. 422/142; 34/57 A; 141/67; 141/35; 141/37; 141/39; 214/17 B; 302/53; 137/587; 422/145
[58] Field of Search ............. 23/284, 288 S; 34/57 A; 141/67, 35, 37, 39; 214/17 B; 302/53

[56] References Cited

U.S. PATENT DOCUMENTS

| | | | |
|---|---|---|---|
| 2,517,042 | 8/1950 | Skelly | 214/17 B X |
| 3,690,841 | 9/1972 | Bunn, Jr. et al. | 23/288 S |
| 3,994,824 | 11/1976 | White et al. | 302/53 X |

*Primary Examiner*—James H. Tayman, Jr.
*Attorney, Agent, or Firm*—Burtsell J. Kearns; Harold M. Snyder

[57] ABSTRACT

A transfer pipe system for transferring particulate bed material from a fluid bed reactor includes a discharge pipe connecting the fluid bed reactor with a vertical transfer pipe, gas injection nozzles for fluidizing particulate material within the transfer pipe and a standpipe connecting the transfer pipe and the freeboard region of the fluid bed reactor to vent fluidizing gas from the transfer pipe into the freeboard region and so avoid introducing a high velocity, counter-current gas flow into the discharge pipe.

7 Claims, 3 Drawing Figures

TRANSFER PIPE SYSTEM

This invention is directed to an improved transfer pipe system for transferring fluidized solids from an elevated fluid bed to a lower bed or reactor.

It is a common necessity in fluid bed reactor operations to transfer bed material from a fluid bed reactor at one elevation to a reactor positioned at a somewhat lower elevation through a transfer pipe system. In a transfer pipe system, an inclined discharge pipe is connected to the fluid bed reactor to allow particulate bed material to flow therefrom. The discharge pipe is connected to a vertical transfer pipe, which conveys bed solids to a second reactor. In order to assist in the smooth transfer of materials through a transfer pipe system, it is usual to provide for the injection of air into the system, and particularly, into the vertical transfer pipe to fluidize the solid particulate materials while in transit. However, in operations where the bed materials undergo physical and chemical changes and/or when appreciable quantities of fines are present in the bed material, it has been found that the flow characteristics of the materials may alter to such an extent that the solids will not flow through the standard transfer pipe system. Some reasons for encountering flow problems are as follows:

A. The angle of repose of the ore may be increased appreciably due to the change in chemical and physical properties of the material. Thus, the solids tend to settle out in the inclined section of the discharge pipe.

B. Bridging occurs in the lower portion of the vertical section of the transfer pipe due to physical properties of the solids and the compacting effect of an increasing head of solids.

C. The fluidizing gases which are introduced into the vertical section of the transfer pipe accelerate the segregation or settling of solids in the inclined discharge pipe. These gases tend to flow along the upper edge of the inclined pipe section, in counter-current flow to the movement of solids. This counter-flow contributes appreciably toward increasing the resistance to solids flow. If the gas flow is sufficiently high in the inclined discharge pipe, solids will be prevented from entering the discharge pipe.

Accordingly, it is an object of this invention to provide an improved transfer pipe system for discharging materials from a fluid bed reactor.

It is another object of the invention to provide in a fluidized transfer pipe system a means for venting fluidizing gases from the system to facilitate discharge of bed material from the fluid bed reactor.

Figure 2:
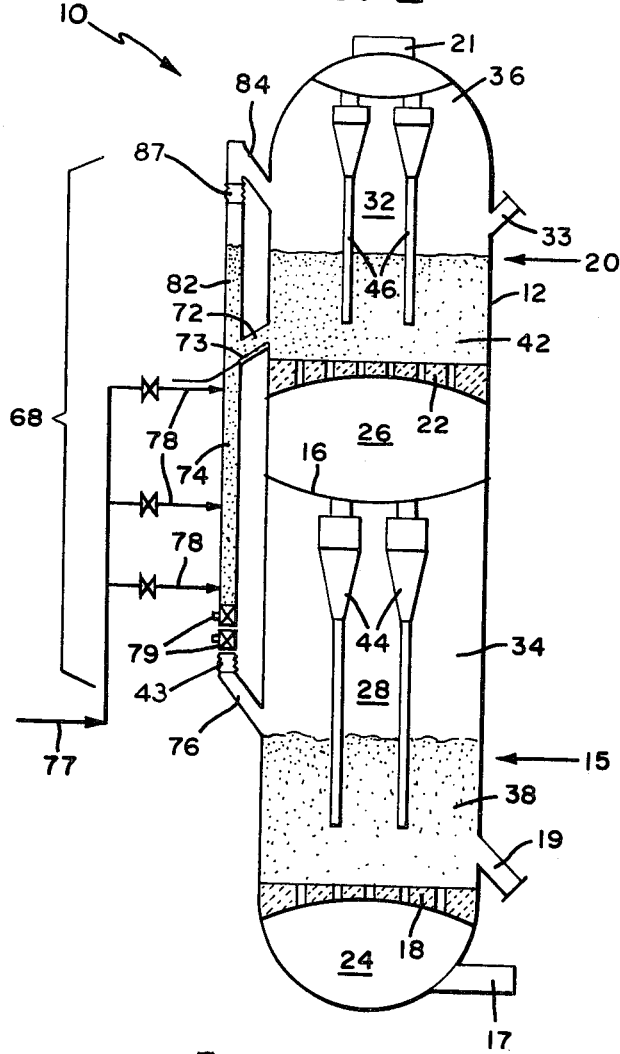
Figure 3:
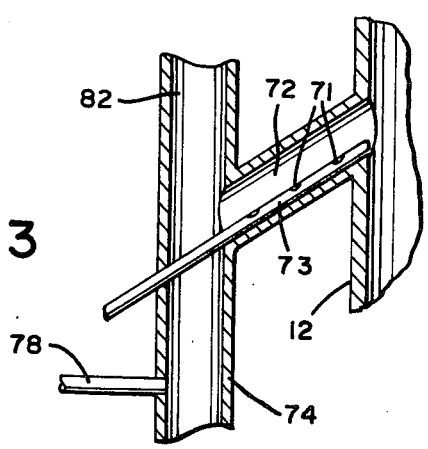

Other objects and advantages of the present invention will become apparent from the following description taken in conjunction with the accompanying drawings in which:

FIG. 1 is a diagrammatic sketch of a multi-bed fluid bed reactor including a transfer pipe system in accordance with the prior art, FIG. 2 is a similar view in section of a multi-bed reactor unit having a transfer pipe system in accordance with the present invention, and FIG. 3 is a fragmentary enlarged view of a discharge pipe with provision for introducing fluidizing air.

Generally speaking, the transfer pipe system of the present invention, which has for its purpose the movement of particulate bed materials from the reaction chamber of a fluid bed unit at a first elevation to a secondary reaction chamber at a lower elevation, comprises an inclined discharge pipe extending downwardly from the reaction chamber of the fluid bed unit to join an essentially vertical transfer pipe which is in communication with the secondary reaction chamber at the lower elevation. A vertical standpipe extends upwardly from the discharge pipe-vertical transfer pipe junction with a vent pipe connecting the standpipe with the freeboard of the fluid bed unit. Means are provided in the transfer pipe system for fluidizing the particulate material in transit therein. It will be understood that the secondary reaction chamber may be another fluid bed unit or some other type of reactor such as a hearth with rabble arms. It is customary to provide a valve at the lower end of the vertical transfer pipe to permit control of the discharge flow.

Referring now to the drawings, there is illustrated a multi-bed fluidized bed reactor 10 having a metal shell 12. Within the shell 12, a partition 16 divides the internal volume of shell 12 into two reactors; a lower reactor 15 and an upper reactor 20. Lower reactor 15 is divided into two compartments by a constriction dome 18 having a windbox 24 therebelow and a reaction chamber 28 thereabove. Within the reaction chamber 28, a bed of particulate material 38 is supported on the constriction dome 18. A gas conduit 17 is provided for introducing fluidizing gas into the windbox 24 and a discharge conduit 19 communicates with the bed 38 to remove bed material as required. Within chamber 28 are also provided a plurality of cyclones 44 which return elutriated solids to bed 38 and pass exhaust gas from reaction chamber 28 to the windbox 26 of the upper reactor 20.

The upper reactor 20 is divided into two chambers by the constriction dome 22 with the windbox 26 therebelow and the reaction chamber 32 thereabove. Within chamber 32 a fluidized bed of particulate solids 42 is supported by the constriction dome 22. In reaction chamber 32 there are positioned a plurality of cyclones 46 which return elutriated solids to the bed 42 and pass exhaust gas to the stack 21. A feed conduit 33 opens into chamber 32 for introducing feed material into the system.

A transfer pipe system 48 is provided for movement of bed material from reaction chamber 32 to reaction chamber 28. A downwardly inclined discharge pipe 52 is in communication at the upper end thereof with bed 42 of reactor 20 and is connected at its lower end to the upper end of vertical transfer pipe 54. In vertical transfer pipe 54 a pair of slide valves 59 is provided to control solids flow. The uppermost of these valves is an emergency valve which is normally open and is closed only when repair or maintenance of the lower (control) valve is required. The lower valve is adjusted to control solids flow. The lower end of vertical transfer pipe 54 is provided with an expansion joint 43 and is connected to an inclined inlet pipe 56 which communicates with the reaction chamber 28. It will be noted that the transfer pipe 54 is an element of substantial length since it bypasses the constriction dome 22 and the windbox region 26 of reactor 20, the partition 16 and the freeboard region 34 of reactor 15. A number of gas injection nozzles 58 are provided in vertical transfer pipe 54 to fluidize the solids in the transfer pipe and so tend to prevent the solids from compacting and bridging in the vertical pipe.

In operation, the transfer pipe system has the function of removing bed material from reaction chamber 32 and passing it to reaction chamber 28 for further treatment.

Valves 59 are open to permit flow of solid particulate matter from bed 42 downwardly into reactor 15. The gas injected through nozzles 58 maintains the particulate material in the transfer pipe system in a fluidized state. However, in some cases, the character of the bed material in reactor 20 is such that it does not flow freely through the transfer pipe system. This may be due to a high angle of repose of the particulate material which can result in blockage of the inclined discharge pipe 52, to the phenomenon of bridging which results from the physical properties of the solids and can stop or restrict flow in the vertical transfer pipe 54 or it may be due to high velocity gases flowing in the discharge pipe 52 in a channel at the upper edge of the inclined section, which tends to resist and restrict the counter-current solids flow.

Turning to FIG. 2, the reactor structure 10 shown is identical in most details with that of FIG. 1, with the principal elements of the reactor structure bearing the same reference characters as in FIG. 1. The essential difference in the structures resides in the transfer pipe system 68 illustrated in FIG. 2. Thus, the discharge pipe 72 communicates with the reactor chamber 32 of the reactor 20 at some level between the top and bottom of bed 42. The outer lower end of the discharge pipe 72 is connected to the vertical transfer pipe 74 and the lower end of the vertical transfer pipe 74 is in communication with the reaction chamber 28 of the reactor 15 through the downwardly inclined inlet pipe 76 which opens into the reactor chamber 28. At the junction of the discharge pipe 72 and the vertical transfer pipe 74 a vertical standpipe 82 is provided which is aligned coaxially with the vertical transfer pipe 74. This vented standpipe 82 extends upwardly to a point which is higher than the top surface of bed 42 within the reaction chamber 32. At its upper extremity, the standpipe 82 is provided with an expansion joint 87 and is connected to a vent pipe 84 (preferably inclined downwardly as shown) which opens into the freeboard region 36 of the reactor chamber 32.

In the operation of the transfer pipe system 68, with the control slide valve 79 closed, the material which flows down through discharge pipe 72 from fluid bed 42 is fluidized by the air injected through the nozzles 78. In the vertical transfer pipe 74 and in the standpipe 82 the particulate solids will assume a bed level which is essentially the same as the bed level of the solids in fluidized bed 42 in the reaction chamber 32. When the control slide valve 79 is opened to permit solids to discharge into the reaction chamber 28, the column in standpipe 82 will drop slightly, causing the pressure in the transfer system at the end of the discharge nozzle 72 to be lower than the pressure at the corresponding elevation in the fluidized bed 42 of reactor 20. The particulate solids in bed 42 will readily flow through the discharge pipe 72 under the influence of this pressure differential. The flow of solids from the fluidized bed 42 into the vertical transfer pipe 74 will continue under the influence of the pressure differential until the pressures are equalized. The fluidizing gases in vertical transfer pipe 74 will stream upward through the standpipe 82 and then, via vent pipe 84, into the freeboard region 36 of reactor 10. The gas flow through the standpipe and vent pipe greatly reduces the counter-current flow of gases in the inclined discharge pipe 72 and so reduces the resistance to solids flow therein.

In this apparatus and process, the entire transfer pipe above the control slide valve 79 may be fluidized or, alternatively, only the particulate solids in the upper section of the vertical transfer pipe 74 need be fluidized. Enough fluidizing gases must be added to the vertical transfer pipe 74 to prevent bridging of the particulate solids. Fluidizing gas can also be added to the bottom edge of the inclined discharge pipe 72, if necessary, through a sparger system. A sparger system is shown in FIG. 3, with sparger tube 73, having gas discharge ports 71 therein, traversing the vertical transfer pipe 74 and lying along the bottom of discharge pipe 72.

Although the present invention has been described in conjunction with the preferred embodiment, it is to be understood that modification and variations may be resorted to without departing from the spirit and scope of the invention as those skilled in the art will readily understand. For example, while the invention has been illustrated as applied to a multi-bed reactor contained within a single enveloping shell, it will be understood that the transfer system of the invention may be applied to individually constructed fluid bed reactors, each having its own shell; provided they are appropriately located with respect to each other, one being substantially higher than the other. It should also be understood that while the uppermost reactor is of the fluid bed type, the lower reactor need not be of the fluid bed type, merely a reactor which operates at higher pressure than the first stage bed. Such modifications and variations are examples of those considered to be within the purview and scope of the invention and appended claims.

We claim:

1. A transfer pipe system for moving particulate bed material from the reaction chamber of a relatively low pressure fluid bed unit at a first elevation to a relatively high pressure secondary reaction chamber at a lower elevation, comprising an inclined discharge pipe extending downwardly from the fluidized bed region of said reaction chamber, a substantially vertical transfer pipe connected to said discharge pipe and having gravity feed connection to said secondary reaction chamber, gas injection means spaced along said vertical transfer pipe to introduce fluidizing gas into said transfer pipe, so that a substantial quantity of the particulate material therein is maintained in a fluidized state, valve control means positioned in said transfer pipe system to control the flow of particulate material under the influence of gravity from said vertical transfer pipe into said gravity feed connection for delivery to said secondary reaction chamber; a vertical standpipe extending upwardly from the junction of said discharge pipe with said vertical transfer pipe to an elevation above the bed level in said fluid bed unit and a vent pipe connecting said standpipe with the freeboard region of said fluid bed unit thereby routing most of the fluidizing gas provided to said transfer pipe system directly to said freeboard region rather than through said discharge pipe so that flow of particulate material through said discharge pipe is not impeded by gas flow from said vertical transfer pipe.

2. The transfer pipe system of claim 1 wherein said secondary chamber is the reaction chamber of a fluid bed reactor.

3. The transfer pipe system of claim 1 wherein said valve control means comprises a slide valve provided at the lower end of said vertical transfer pipe.

4. The transfer pipe system of claim 1 wherein said gravity feed connection is provided by a short inclined pipe section.

5. A transfer pipe system in accordance with claim 1 wherein said gas injection means comprises a plurality of gas nozzles in said vertical transfer pipe for injecting gas into said vertical transfer pipe.

6. The transfer pipe system of claim 5 wherein a sparger is provided in said discharge pipe to assure fluidization of particulate material therein.

7. The transfer pipe system of claim 6 wherein the vent pipe is downwardly inclined from the vertical standpipe to the reaction chamber of the fluid bed unit.

* * * * *